Aug. 30, 1960 T. V. INWOOD 2,951,032
HYDROCARBON DESULFURIZATION PROCESS
Filed Feb. 16, 1956
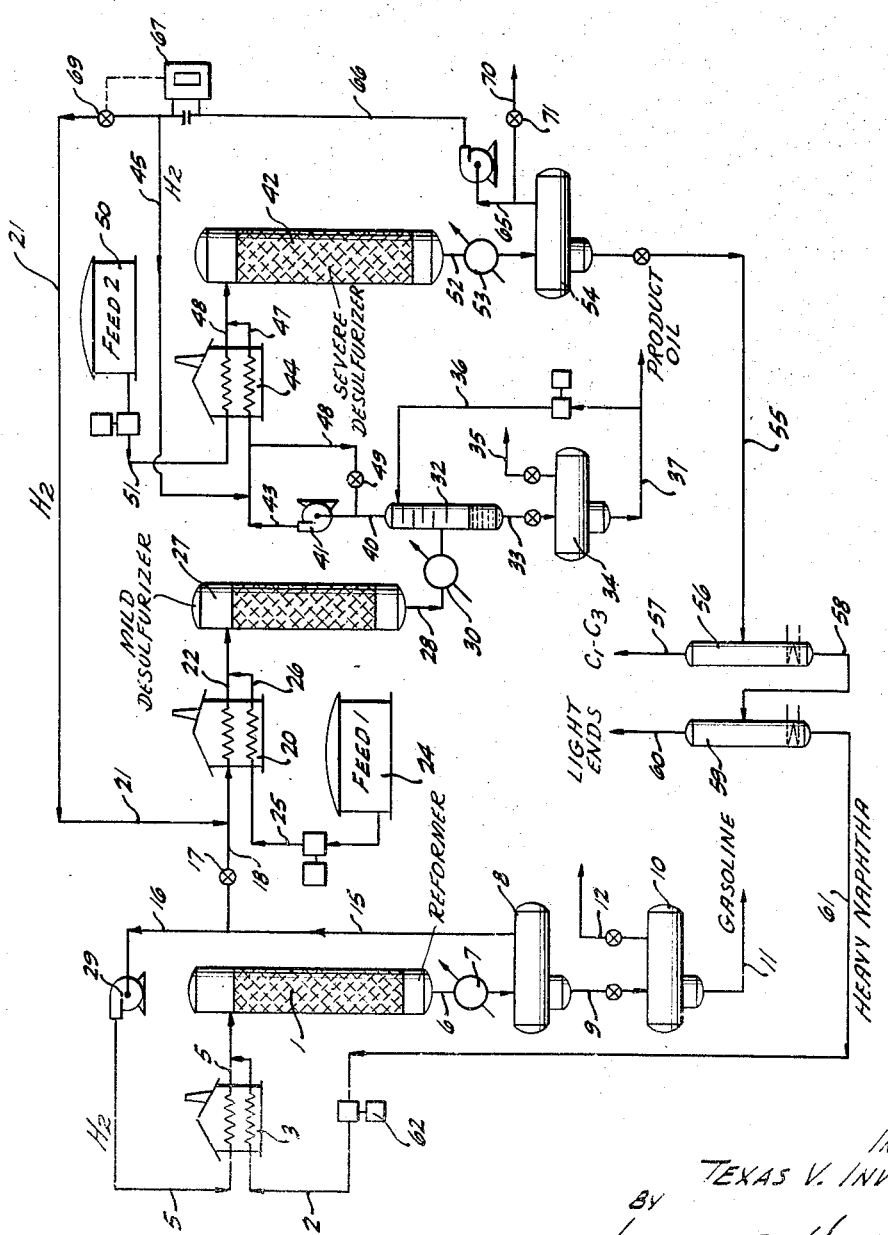
INVENTOR.
TEXAS V. INWOOD,
BY
James S. Henderson
AGENT.

United States Patent Office 2,951,032
Patented Aug. 30, 1960

2,951,032
HYDROCARBON DESULFURIZATION PROCESS
Texas V. Inwood, La Habra, Calif., assignor to Union Oil Company of California, Los Angeles, Calif., a corporation of California
Filed Feb. 16, 1956, Ser. No. 565,800
11 Claims. (Cl. 208—213)

This invention relates to a process for desulfurizing two different hydrocarbon feedstocks by hydrogenation under selected conditions, utilizing for both operations the hydrogen-containing off-gases from a catalytic reforming operation. Briefly, the invention comprises first utilizing at least part of the reformer off-gases in a low-temperature desulfurization zone at low hydrogen/oil ratios to effect a mild desulfurization of the stock and a concentration of the hydrogen stream, then passing the remaining hydrogen stream into a high temperature, high pressure desulfurization zone utilizing high hydrogen/oil ratios, to accomplish a substantially complete desulfurization and/or denitrogenation of another feedstock. The hydrogen recycle stream of the high-temperature desulfurizer is preferably maintained at a desired hydrogen concentration by recycling a slip stream therefrom back to the low temperature desulfurizer. In this manner, it is found possible to utilize completely the hydrogen in the reformer off-gases without employing an extraneous hydrogen purification system.

The desulfurization operations described herein are generally referred to as catalytic "hydrodesulfurization," or "hydrofining." Such processes embody essentially the treatment of hydrocarbon fractions at temperatures between 500–850° F., generally at high pressures, in the presence of hydrogen and a catalyst, whereby organic sulfur compounds are selectively hydrocracked to produce hydrogen sulfide and hydrocarbon fragments. At the same time, any organic nitrogen bases are largely decomposed to ammonia and hydrocarbons. These processes are distinguished from the endothermic, hydrogen-producing type of conversion known as reforming, or hydroforming, wherein somewhat higher temperatures, and/or lower space velocities are employed in order to effect rearrangement of hydrocarbons, as by cyclization, aromatization, isomerization and the like, whereby the knock rating of the gasoline is improved.

The reforming type of process mentioned above usually results in a net make of hydrogen due to the dehydrogenation of naphthenes to aromatics, and possibly from other reactions. It is therefore necessary in such operations to bleed off, more or less continuously, a portion of the recycle hydrogen stream in order to prevent the buildup of the system pressure. These make-gases generally comprise between about 40% and 90% by volume of hydrogen, the remainder being mostly methane.

A principal object of this invention is to provide means for the economical utilization of hydrogen-containing make-gases from a reformer whereby substantially all of the hydrogen contained therein may be utilized for carrying out the aforementioned desulfurization operations without employing extraneous hydrogen purification steps for eliminating the methane. A further objective is to utilize such off-gases in a two-stage desulfurization operation whereby both cracked and straight-run distillates may be conveniently desulfurized. A still further object is to provide for such hydrogen utilization in a two-stage desulfurization system, and at the same time maintain both of the desulfurization zones under substantially non-regenerative operation. Another object is to avoid the use of extraneous systems for removing hydrogen sulfide from recycle gas streams in desulfurization reactions. A still further object is to provide, in a hydrocarbon desulfurization process, an indigenous oil absorption system for concentrating a hydrogen-containing gas stream. Another object is to provide an optimum combination of a low temperature, non-regenerative desulfurization and a high temperature, non-regenerative desulfurization, whereby the recycling of hydrogen streams from low pressure to high pressure units is minimized, thereby reducing power consumption. Other objects and advantages will be apparent to those skilled in the art from the description which follows:

Briefly, this invention relates to an integrated petroleum refining and desulfurization process wherein the hydrogen-rich off-gases from a reformer are employed in the first instance, preferably at substantially the reforming pressure, to partially desulfurize non-refractory distillates, e.g. straight run stocks, at low temperatures, and preferably on a once-through basis. The products therefrom are condensed into a high pressure separator at substantially the reactor pressure to effect thereby a concentration of hydrogen in the supernatant gas phase, the liquid phase acting as a selective absorbent for soluble gases such as methane, ethane and hydrogen sulfide. The concentrated gas phase from the high pressure separator is then employed in a second catalytic reactor to desulfurize either the same type of stock, or a more refractory material, but in any event to effect a more severe treatment than in the first desulfurizer, whereby the second feedstock is substantially completely desulfurized and/or denitrogenated. The second desulfurization is necessarily conducted at a high pressure, and higher temperatures and higher hydrogen/oil ratios are maintained than in the first desulfurizer.

In order to economically utilize the available hydrogen in the second desulfurizer, a substantial recycle stream is maintained therein. In the first desulfurizer, the consumption of hydrogen is small, e.g. 10–100 s.c.f. per barrel of feed; in the second, the consumption of hydrogen is considerably higher, e.g. 100–1000 s.c.f. per barrel of feed. Under these conditions, the recycle stream in the second desulfurizer will become lean in hydrogen due to the chemical consumption thereof, and to the fact that the more severe conditions tend to produce additional methane by cracking. When the recycle stream of the second desulfurizer becomes undesirably dilute in hydrogen a bleed stream is taken off, and preferably depressured and recycled to the first desulfurizer where it undergoes concentration along with the primary off-gas from the reformer. In the first desulfurizer, the hydrogen/oil ratio is such that in the succeeding high pressure condenser-separator, a large proportion of the methane and hydrogen sulfide are removed from the gas stream. Preferably, the amount of stock treated in the low temperature desulfurizer is adjusted toward the primary object of maintaining the desired concentration of hydrogen in the recycle stream of the high temperature desulfurizer. Various modifications and amplifications of this basic procedure will be explained more fully hereinafter.

It will be apparent that the desired continuous purification and concentration of the recycle gases cannot be obtained alone in the high temperature desulfurizer, primarily because the consumption of hydrogen is too high, and the dry gas make, e.g. methane, is too high. The practical utilization of a desulfurizer-high pressure condenser-separator sequence for concentrating a hydrogen stream is necessarily limited to those operations wherein low hydrogen/oil ratios are permissible, and where the hydrogen consumption is low, as in the first desulfurizer.

It might appear that equivalent results would be obtained by employing the reformer off-gas first on a once-through basis for the high temperature desulfurization, then reconcentrating in a succeeding low-temperature desulfurizer-condenser, followed by recycling to the high temperature unit. This is impractical however, mainly because it involves first pressuring the reformer off-gas up to the pressure of the high temperature desulfurization unit, then depressuring the entire off-gas into the low temperature desulfurizer, and then repressuring the off-gas from the low temperature desulfurizer back into the high temperature unit. The process described herein provides for a minimum of repressuring of recycle gases.

It might also appear that similar results could be obtained by employing the reformer off-gas first on a continuous recycle basis for the high temperature desulfurization, followed by re-concentration of a small bleed stream therefrom in a succeeding low hydrogen/oil ratio desulfurizer-condenser. This would in some cases avoid the necessity for continuously repressuring a large volume of gas from the second desulfurizer back into the high temperature desulfurizer. It has been found that this procedure is practical mainly in those cases where the original off-gas from the reformer is fairly pure to begin with, e.g. between about 85% and 95% pure. However, in cases where the off-gas from the reformer is only about 40–85% hydrogen, very little internal recycle can be maintained in the high temperature desulfurizer, and the operation becomes essentially a once-through type, wherein the bleed stream to the mild desulfurizer is substantially as great as the total volume of gas being supplied to the high temperature unit, requiring large power consumption for repressuring recycle gases. The present combination is particularly adapted to the utilization of reformer off-gases which are relatively lean in hydrogen, i.e. between about 40% and 85%.

If the reformer make-gas is employed only in a high-temperature desulfurizer, which necessitates the use of hydrogen/oil ratios which are high in relation to the proportion of the hydrogen which will actually be consumed per pass, it is necessary to maintain a large recycle stream in the desulfurizer in order to utilize an economically attractive amount of the hydrogen. As a result of recycling, and the concomitant reduction in make-up gas supplied, the methane in the system builds up to such a degree that the dilution effect begins to inhibit the reaction, and there is an increase in the rate of coking. Moreover, such large volumes of inert gas must be recycled that the cost in equipment, power and heating becomes excessive. When the hydrogen content in the recycle gas drops to 25%, for example, it is then necessary to circulate and reheat 3 volumes of methane for each volume of hydrogen recirculated. The heat capacity of methane at the reaction temperature is a serious economic factor as is evident from the data:

|  | Heat capacity, Cal./Deg. mole | |
|---|---|---|
|  | at 260° F. | at 800° F. |
| $CH_4$ | 9.74 | 13.9 |
| $H_2$ | 6.97 | 7.035 |

The most refractory stocks treated herein comprise mainly the various thermally or catalytically cracked distillates. The hydrodesulfurization of such cracked distillates requires in the first place fairly severe conditions, i.e. high temperatures, in order to hydrocrack refractory sulfur compounds such as thiophene, which are usually present in considerable quantities. The use of high temperatures in turn necessitates the use of high hydrogen partial pressures, inter-alia, to retard coking and deactivation of the catalyst. A principal objective in such hydrodesulfurization treatments has been to achieve a non-regenerative process, whereby the catalyst may be kept on-stream for long periods of time, e.g. three to six months, or at least about 30 days, before regeneration is required to remove coke and other deposits. This objective cannot be achieved in the exhaustive desulfurization or denitrogenation of cracked stocks unless high total pressures and high hydrogen partial pressures are employed, conditions which are economically inconsistent with the use of dilute hydrogen streams.

Straight-run stocks, particularly high-boiling fractions, may also require relatively severe process conditions in order to effect complete desulfurization, and/or effective removal of nitrogen. Therefore similar difficulties are sometimes encountered in utilizing dilute hydrogen streams for the exhaustive desulfurization and/or denitrogenation of straight-run stocks, crude oils and heavy residual stocks, such as may be employed for cracking charge-stock.

For all the above reasons, in exhaustive desulfurization, it is necessary to remove a bleed stream from the recycle gas system, and either treat it in some type of hydrogen purification system or burn it as fuel gas. According to the present invention, this bleed stream, which may preferably be of approximately the same composition as the off-gases from the reformer, is simply admixed with those off-gases, and the combined stream treated in a low temperature desulfurization zone with a feedstock which may be at least partially desulfurized at low temperatures and low hydrogen/oil ratios. Desirable feedstocks for the latter type of desulfurization comprise the various straight-run, sulfur-bearing distillates which are obtained by direct distillation of crude oil. It has been found that the sulfur compounds in such distillates are mostly less refractory than those in the cracked stocks. Apparently, in straight-run stocks a larger proportion of the organic sulfur is in the form of mercaptans, disulfides, aliphatic sulfides, thiophanes, etc., which are more readily hydrocracked than thiophenes for example. The objective in treating such feedstocks herein may be to accomplish a partial or substantial desulfurization, color improvement, sweetening, etc. The conditions for the low temperature treatment are such that hydrogen consumption is low and methane production is low, and since the hydrogen/oil ratios are also relatively low, a substantial concentration of hydrogen gas is obtained in the succeeding high pressure condenser-separator.

The low temperature desulfurization described herein has been found to effect a substantial desulfurization of straight run stocks, even with gas streams containing for example 30–60% by volume of hydrogen. If the hydrogen/oil ratio in this unit is too low, the chemical consumption of hydrogen may effect an overall decrease in the hydrogen content of the off-gases. To obtain optimum results, it is therefore preferable to utilize a gas/oil ratio equivalent to about 25–400 s.c.f. of pure hydrogen per barrel of feed, and preferably between about 40–300 s.c.f. per barrel. In the preferred modification, not more than about 50% of the hydrogen supplied is chemically consumed per pass, and there is an overall hydrogen enrichment of the off-gases therefrom, under the particular desulfurization conditions employed. These conditions include temperatures between about 550–750° F., pressures of about 0–1000 p.s.i.g., and a space velocity of about 1–20 volumes of liquid feed per volume of catalyst per hour. These mild conditions are required in order to permit the use of low hydrogen partial pressures without excessive coking of the catalyst. These conditions are distinctly different from those usually employed in desulfurization. The usual conditions comprise for example temperatures of about 650–850° F., pressures of 500–10,000 p.s.i.g., space velocities between about 2 and 10, and pure hydrogen rates between about 600 and 10,000 s.c.f. per barrel of feed. These latter conditions may be employed for the second, or severe, desulfurization described herein.

In the combination herein described it is essential that the second, or severe, desulfurization be conducted at a higher temperature, preferably at least 100° F. higher, than the first, or mild, desulfurization. Also the pressure in the severe desulfurizer is preferably at least about 200 p.s.i.g. higher than in the mild desulfurizer, while the hydrogen/oil ratio is necessarily at least about 200 s.c.f. per barrel higher in the severe unit than in the mild unit. All of these conditions, both relative and absolute, result in the severe desulfurizing unit acting as a hydrogen-depleting factor, and the mild desulfurizing unit acting as a hydrogen-enriching factor.

The feed stock to the mild desulfurization unit may comprise substantially any mineral oil distillate, including cracked and straight run stocks, but preferably straight run materials. Stocks which may be treated to greatest advantage in this unit include for example stove oils, diesel fuels, gas oils, cracking charge stocks, naphthas and the like. The beneficial results observed in the treatment of these stocks include a substantial desulfurization, sweetening, color improvement, improvement in gum stability, odor improvement and the like. The treatment ordinarily does not effect a complete desulfurization or denitrogenation.

In the second, or severe, desulfurizing unit, the feedstocks may comprise any of the above materials, and in addition any of the large variety of cracked materials of which a substantially complete desulfurization and/or denitrogenation may be desired. Cracked gasolines or gas oils may be employed, coker distillates, or catalytic cracking cycle oil. In all of these cases it is found that the treatment usually effects at least about 95% sulfur removal, and from about 85–95% nitrogen removal. In this case also the color, odor, and gum-stability of the product are also substantially improved. The naphtha feedstock to the reformer may also be advantageously treated in the severe desulfurization unit. These stocks ordinarily comprise blends of cracked and straight run naphthas, and when sulfur-sensitive reforming catalysts such as platinum are employed in the reforming zone, it is essential to remove substantially all of the sulfur compounds.

The catalysts employed in the separate desulfurization zones herein may comprise any of the transitional metals, metal oxides, metal sulfides, or other metal salts which are known to catalyze hydrodesulfurization, and are not poisoned by hydrogen sulfide or other sulfur compounds. The preferred catalysts comprise the oxides and/or sulfides of the metals in groups VIB and VIII of the periodic table, as for example the oxides or sulfides of molybdenum, tungsten, iron, cobalt, nickel, chromium and the like. Vanadium compounds may also be employed in some cases. A particularly active combination consists of a group VIB metal oxide or sulfide with a group VIII metal oxide or sulfide. For example compositions containing both molybdenum oxide and cobalt oxide, molybdenum oxide and nickel oxide, tungsten sulfide and nickel sulfide, and the like may be employed. The catalysts employed in the two desulfurization zones may be the same or different.

A particularly active catalyst consists of the composite known as cobalt molybdate, which actually appears to be a mixture of cobalt and molybdenum oxides wherein the molecular ratio of Co to Mo may be between about 0.4 and 5.0. This catalyst, or any of the above catalysts may be employed in unsupported form, or alternatively it may be distended on a suitable adsorbent oxide carrier such as alumina, silica, zirconia, thoria, magnesia, titania, bauxite, acid activated clays, or any combination of such materials. Of the foregoing carriers, it has been found that the preferred material is alumina, and especially alumina containing about 3–8% by weight of silica.

In the preparation of an unsupported cobalt molybdate catalyst the catalyst can be coprecipitated by mixing aqueous solutions of, for example, cobalt nitrate and ammonium molybdate, whereby a precipitate is formed. The precipitate is filtered, washed, dried and finally activated by heating to about 500° C. Alternatively, the cobalt molybdate may be supported on alumina by coprecipitating a mixture of cobalt, aluminum and molybdenum oxides. A suitable hydrogel of the three components can be prepared by adding an ammoniacal ammonium molybdate solution to an aqueous solution of cobalt and aluminum nitrates. The precipitate which results is washed, dried and activated. In still another method a washed alumina hydrogel is suspended in an aqueous solution of cobalt nitrate and an ammoniacal solution of ammonium molybdate is added thereto. By this means a cobalt molybdate gel is precipitated on the alumina gel carrier. Catalyst preparations similar in nature to these and which can also be employed in this invention have been described in U.S. Patents 2,369,432 and 2,325,033.

Still other methods of catalyst preparation may be employed such as by impregnating dried carrier material, e.g. an alumina-silica gel, with an ammoniacal solution of cobalt nitrate and ammonium molybdate. Preparations of this type of cobalt molybdate catalyst are described in U.S. Patent 2,486,361. In yet another method for preparing impregnated molybdate catalyst the carrier material may be first impregnated with an aqueous solution of cobalt nitrate and thereafter impregnated with an ammoniacal molybdate. Alternatively, the carrier may be impregnated with both solutions in reverse order. Following the impregnation of the carrier by any of the foregoing methods the material is drained, dried and finally activated in substantially the same manner as is employed for the other catalysts. In the preparation of impregnated catalysts where separate solutions of cobalt and molybdenum are employed, it has been found that it is preferable to impregnate the carrier first with molybdenum, e.g. ammoniacal ammonium molybdate, and thereafter to impregnate with cobalt, e.g. aqueous cobalt nitrate, rather than in reverse order.

In yet another method for the preparation of suitable catalysts, a gel of cobalt molybdate can be prepared as described hereinbefore for the unsupported catalyst, which gel after drying and grinding can be mixed with a ground alumina, alumina-silica or other suitable carrier together with a suitable pilling lubricant or binder which mixture can then be pilled or otherwise formed into pills or larger particles and activated.

In yet another modification finely divided or ground molybdic oxide can be mixed with suitably ground carrier such as alumina, alumina-silica and the like in the presence of a suitable lubricant or binder and thereafter pilled or otherwise formed into larger agglomerated particles. These pills or particles are then subjected to a preliminary activation by heating to 600° C., for example, and are thereafter impregnated with an aqueous solution of cobalt nitrate to deposit the cobalt thereon. After draining and drying the particles are heated to about 600° C. to form the catalyst.

It is apparent from the foregoing description of the different types of cobalt molybdate catalyst that either an unsupported catalyst, in which case the active agents approximate 100% of the composition, or a supported catalyst wherein the active agents, e.g. cobalt and molybdenum oxides, comprise from about 7 to 22% by weight of the catalyst composition may be employed.

The catalyst employed for the reforming operation which produces the reformer make-gases is not a critical feature of the present invention, although it does have a direct bearing thereon. Certain reforming catalysts, the most noteworthy of which consists of platinum deposited on alumina, are very selective in their hydroforming activity, and generally produce only small amounts of methane. Typical off-gases from such a reformer contain about 80–90% by volume of hydrogen. Other catalysts may be employed which are somewhat less selective, producing relatively more methane. Such catalysts include for example the cobalt molybdate above discussed, and in general the above-described transitional metals or metal oxides. These catalysts may produce, under typical reforming conditions, an off-gas which is from 40%–85% by volume hydrogen.

It should be understood that the recycle gases discussed herein, either in the reformer or in the desulfurizers, may also contain hydrocarbons such as ethane, ethylene, propane and the like. However those materials are ordinarily so soluble in the liquid products that they are effectively removed during high pressure condensation as a solution in the liquid product, from which they are subsequently removed. The same applies to some extent to hydrogen sulfide. It is therefore convenient and sufficiently accurate to characterize the various recycle gases on the basis of their methane/hydrogen ratio.

The desulfurization operations described herein may be effected in any suitable equipment, a particularly satisfactory system comprising fixed bed processes in which the catalyst is disposed in one or more reaction zones and the hydrocarbon fractions to be treated are passed therethrough, either in upward or downward flow, generally concurrently with the stream of hydrogen. In such processes the catalyst may either be disposed to provide for axial flow of gases therethrough, or for radial flow. Fluidized processes in which the catalyst is suspended in one or more of the gaseous reactants and maintained in a state of turbulence in the reaction zone under hindered settling conditions may also be employed. Also, moving bed type processes in which the reactants are passed concurrently or countercurrently to a moving bed of catalyst, or the suspensoid type operation in which the catalyst is carried as a slurry in the reactants may also be employed. Conventional processes using guard reactors to remove impurities from the charge stock prior to treatment may be employed if desired.

Reference is now made to the accompanying flow sheet which illustrates some of the specific features of the invention. The invention should not however be construed as restricted to the details described therein.

Hydrogen for the desulfurization units is produced herein by the operation of a catalytic reformer 1. This unit is conventional in the art and hence will not be described in detail. The charge stock employed therein consists mainly of heavy naphthas, usually including a predominant proportion of straight-run naphthas. If a sulfur-sensitive reforming catalyst is employed, such as platinum alumina, the charge stock should be essentially free of sulfur. Other reforming catalysts such as molybdenum oxide or cobalt molybdate are effective to some extent in the presence of sulfur compounds, and hence either sulfur-free or sulfur-containing naphthas may be employed in those cases. In the present case, the charge stock consists of a desulfurized, depentanized blend of cracked and straight-run naphtha which is recycled to the reformer via line 2 and preheater 3, wherein it is heated to reforming temperature, then blended with preheated recycle hydrogen in line 5. The mixture of hydrogen and vaporized feed stock then passes into the top of the reformer, and is removed at the bottom through line 6. The combined effluent is then cooled to approximately atmospheric temperature in condenser 7 and passed into a high pressure gas-liquid separator 8. The liquid product is withdrawn through line 9 and transferred to a low pressure gas-liquid separator 10, from which the final product is withdrawn through line 11, and light hydrocarbon fuel gas is withdrawn through line 12.

The gas phase in separator 8 constitutes the hydrogen recycle stream, which is withdrawn through line 15. The major part of this stream is recycled to the reformer via line 16. A part of this stream however is withdrawn through line 18 for use in desulfurizer 27, described hereinafter. Desulfurizer 27 is preferably maintained at substantially the reformer pressure by the operation of compressor 41 and valve 49, to be subsequently described. The flow of gas through line 18 is hence responsive to the reformer pressure. An auxiliary pressure controlled valve 17 may be inserted in line 18 in case it is desired to operate desulfurizer 27 at a pressure different from that of the reformer. The hydrogen concentration of the gas stream in line 18 may vary between about 40% and 85% by volume, although other concentrations may occasionally be encountered.

The hydrogen stream in line 18 then flows through preheater 20, in admixture with a recycle stream of hydrogen admitted through line 21 from the low temperature desulfurizer described hereinafter. The preheated hydrogen mixture is withdrawn from the heater through line 22, and is admixed therein with preheated feed stock for the low temperature desulfurizer. This feed stock is derived from storage tank 24, and is pumped into line 22 via line 25, preheater 20 and line 26. The feed stock plus hydrogen is then admitted from line 22 into the top of low temperature desulfurizer 27, wherein it flows downwardly in contact with the catalyst, under the mild conditions previously described to effect a partial desulfurization, denitrogenation, color improvement, sweetening, and/or stabilization. The pressure in desulfurizer 27 is preferably maintained at substantially the same pressure of the reformer, thereby conserving the pressure already built up in reformer 1 by means of compressor 29. Reforming operations are generally conducted at between about 200 and 1000 p.s.i.g., and hence the pressure in desulfurizer 27 is preferably maintained within those limits. The product is then withdrawn through line 28, cooled in condenser 30, and then passed into high pressure separator 32, at substantially the reactor pressure.

In condenser 30 and high pressure separator 32 the principal purification of the hydrogen stream is accomplished. This is effected by what amounts to a one-stage scrubbing operation, but requires for its success (1) that conditions prevail in desulfurizer 27 which consume only a small portion of the hydrogen supplied and produce substantially no methane, and (2) that the overall hydrogen/oil ratio is maintained within limits such that the one-stage selective absorption of methane in separator 32 will effect an overall hydrogen enrichment, preferably sufficient to reduce the methane content of the gas phase by at least 50% of that of the combined hydrogen stream supplied via line 22.

The liquid product from separator 32 is then withdrawn through line 33 into a low pressure separator 34, wherein the pressure is reduced to approximately atmospheric to permit the flashing of dissolved light gases, e.g. methane, ethane $H_2S$, etc., which are withdrawn via line 35. The final desulfurized liquid product is withdrawn via line 37 and sent to storage. In cases where insufficient feed stock is available for effecting the desired purification of the available hydrogen in desulfurizer 27, a portion of the liquid product in line 37 may be diverted through line 36 to the top of separator 32, where it effects additional purification of the off-gases by countercurrent scrubbing.

The purified hydrogen from separator 32 is then exhausted via line 40 by means of compressor 41 which compresses the gas up to the pressure desired in high temperature desulfurizer 42. The compressed gas passes via line 43 into preheater 44, in combination with an internal recycle stream from line 45. In order to maintain the desired pressure in low temperature desulfurizer 27, a manifold line 48 connects high pressure line 43 and low pressure line 40 through a pressure-controlled motor-valve 49. Thus, when the pressure in desulfurizer 27 begins to drop below that desired in the reformer, valve 49 is opened to permit the return of gases from high pressure line 43. Valve 49 is essentially a safety-valve, and very little gas is ordinarily recycled backward through line 48.

The desired pressures in the system may be maintained by adjusting the proportion of feedstock which is admitted to desulfurizer 27 through line 25. Insofar as the hydrogen stream is concerned, desulfurizer 27 operates primarily as a hydrogen purifying unit, while desulfurizer 42 operates as a hydrogen consuming unit, and by suitably adjusting the flow of feedstocks to the two units, the desired pressures are automatically maintained therein, the differential pressure being maintained by compressor 41.

The preheated hydrogen from preheater 44 is passed via line 47 into feed line 48 which carries secondary vaporized, preheated feedstock derived from storage tank 50 via line 51 and preheater 44. The combined feed stream in line 48 then passes into desulfurizer 42 wherein exhaustive desulfurization under the relatively severe conditions described above is allowed to take place. In this operation a substantial proportion of the feed hydrogen is consumed, and some methane, ethane, H₂S and the like are generated. The resulting product is withdrawn through line 52, cooled in condenser 53 and admitted at the reactor pressure into high pressure separator 54. The desulfurized liquid product, in the case of a naphtha stock intended for reformer feed, is withdrawn through line 55, passed into a depropanizer column 56 wherein light fuel gas is taken overhead through line 57, including methane, ethane, propane and H₂S. The bottoms from depropanizer 56 is withdrawn through line 58 and passed into a second fractionating column 59 wherein the light ends are separated overhead via line 60, such light ends being ordinarily not benefited by the reforming operation. The heavy naphtha is then withdrawn through line 61, and pressured via pump 62, into reformer feed line 2.

The gas phase in separator 54 comprises the internal recycle gas for desulfurizer 42, and the major portion thereof is continuously recycled via line 65, line 66, and line 45 as previously described. However, when this recycle stream becomes undesirably dilute in hydrogen, a hydrogen-analyzer-controller 67 interposed in line 66 opens motor valve 69 to withdraw a portion thereof which is passed via line 21 into hydrogen feed line 18 to the low temperature desulfurizer 27. The hydrogen analyzer controller 67 may be suitably calibrated so as to maintain the recycle gas stream in line 66 at substantially the same concentration as that in line 18. However, in case the recycle gas from the reformer is too dilute, it may be desirable to maintain the gas stream in line 66 at a higher purity. In this case the hydrogen analyzer controller is adjusted so as to maintain a higher purity in line 66, entailing the recycling via line 21 of a purer hydrogen stream than that derived from the reformer. In either case, the low temperature desulfurizer 27, in combination with the succeeding high pressure separator 32, operates to effect a substantial purification of the combined hydrogen stream.

While the above described process may ordinarily be maintained at the desired differential pressure levels in reactors 27 and 42 by suitably adjusting the proportion of feed-stocks admitted thereto, as an additional safety measure, an exhaust line 70 is provided from high pressure separator 54, through which fuel gas may be exhausted by the operation of pressure controlled motor valve 71, to thereby prevent any uncontrollable increase in pressure of the system.

Many modifications in the above described process are feasible as will be apparent to those skilled in the art. For example, instead of employing only one low temperature desulfurizing unit 27, several such units may be employed in series, whereby additional hydrogen purification is obtained. In this type of operation, the pressure in the multiple units is also governed by the pressure of gases supplied from the reformer, the off-gases from separator 32 merely being admixed with additional feedstock and treated similarly as in reactor 27.

Also, the hydrogen analyzer controller 67 may alternatively be interposed into line 47 to control the composition of the combined hydrogen stream to the high temperature desulfurizer.

Although it is preferable to operate desulfurizer 27 at the reformer pressure, if increased purity of the hydrogen stream is desired, this unit may be operated at a higher pressure, e.g. substantially that of the high temperature desulfurizer 42. In this manner, the high pressure separator 32 will effect increased purification of the hydrogen stream. If the reformer make gas is compressed in this manner, it may be desirable to pass a part thereof directly into the high temperature desulfurizer 42. In this manner, the recycle gas can be maintained at any calculated purity by adjusting the porportion of reformer off-gas going to the high temperature and low temperature desulfurizers respectively. All of these modifications however embrace the common objective of utilizing a low temperature, mild desulfurizer wherein a low hydrogen/oil ratio is maintained, to effect a concentration of some part of the hydrogen stream to a high temperature desulfurizer which, due to its inherent requirements, causes a continuous dilution of the recycle hydrogen stream.

To illustrate further a specific mode of operation the following example is recited which is merely typical of the results obtainable, and is thus not intended to be limiting in scope.

*Example*

A moving-bed, cobalt molybdate, countercurrent flow reforming unit is found to produce, by the reforming of 1130 barrels/day of 450° F. end point straight-run gasoline, 1000 M s.c.f. per day of make-gases, which analyze approximately 65% hydrogen and 35% methane by volume. The reforming conditions include a temperature of 950° F., and a pressure of 450 p.s.i.g. The make-gases are to be utilized in a two-stage desulfurization process employing two separate reactors, both of which are packed with a cobalt-molybdate type catalyst consisting essentially of 3% by weight of CoO and 9% by weight of MoO₃ supported on a 5% SiO₂-95% Al₂O₃ carrier in coprecipitated form. The catalyst particles are in the form of ¼ inch pellets.

The make-gas from the reformer, admixed with a stream of 65% hydrogen recycle gas from a high-temperature desulfurizer hereinafter described, is then employed on a once-through basis, in a low temperature desulfurizer for desulfurizing a sour, straight-run stove oil having a boiling range of 350°–600° F., and containing 0.2% by weight of total sulfur and 0.024% of mercaptan sulfur. The reaction conditions are as follows:

Hydrogen/oil ratio _____ s.c.f./bbl__ 50
Temperature _____ ° F__ 600
Pressure _____ p.s.i.g__ 450
LHSV _____ 5

The effluent from the low-temperature desulfurizer is cooled to about 70° F. and admitted to a 450 p.s.i.g. gas-liquid separator. The off-gas from the separator is found to be about 81% by volume hydrogen. The doctor sweet liquid product is found to contain 0.01% total sulfur, and about 0.0002% of mercaptan sulfur. There is also a noticeable color improvement and reduction in gum-forming properties.

The total off-gases from the 450 p.s.i.g. gas-liquid separator are then pressured up to 1000 p.s.i.g., preheated in admixture with an internal recycle gas hereinafter described, and passed into the second desulfurizer in admixture with a feed comprising 65% by volume cracked gasoline and 35% straight-run gasoline, the blend containing 31% by volume of olefins and 2.3% by weight of sulfur. This feed material is fed through the desulfurizer at a temperature of about 750° F., a pressure of 1000 p.s.i.g., and at a rate of 5 liquid volumes per volume of catalyst per hour, the hydrogen/oil ratio being about 2000 s.c.f./bbl. of feed. An internal recycle stream is maintained in the second desulfurizer, and its composition is continuously controlled so that its hydrogen concentration ranges between about 55% and 65% by volume. This desired hydrogen concentration is maintained by means of a hydrogen analyzer-controller in the recycle line, which actuates a motor valve to bleed off gases when the hydrogen content decreases below the desired level. The bleed-gas is depressured and recycled to the first desulfurizer as described above, to obtain overall complete hydrogen consumption. The final desulfurized product contains about 0.005 percent sulfur, and the nitrogen content is substantially reduced.

Results very similar to those outlined in the above example are obtained when utilizing other desulfurization catalysts, other feedstocks, and other process conditions within the scope of the general disclosure herein. Those skilled in the art will readily understand that various modifications are feasible.

While the process has been described with particular reference to the utilization of a reformer off-gas, obviously any other impure hydrogen stream of similar composition may be similarly utilized in the two desulfurizers.

The foregoing disclosure should therefore not be considered as limiting in scope since many variations may be made by those skilled in the art without departing from the scope or spirit of the following claims.

I claim:
1. A process for effecting substantially complete chemical utilization of an impure hydrogen supply stream in a combination hydrofining process without employing purification steps extraneous to said hydrofining process, said hydrogen supply stream initially containing between about 40% and 85% by volume of hydrogen, which comprises subjecting a first sulfur-containing hydrocarbon feed to mild catalytic hydrofining in admixture with said hydrogen supply stream to effect partial desulfurization thereof, cooling and condensing the effluent from said mild hydrofining at substantially the reactor pressure to produce a partially desulfurized liquid product and a first tail-gas containing a higher concentration of hydrogen than said impure supply stream, withdrawing said first tail-gas and continuously passing the same in its entirety to a severe catalytic hydrofining zone in admixture with a second sulfur-containing hydrocarbon feed to effect at least about 95% desulfurization thereof, cooling and condensing the effluent therefrom at substantially the reactor pressure thereby producing a desulfurized liquid product and a second tail-gas containing a lower proportion of hydrogen than said first tail-gas, continuously recycling a first portion of said second tail-gas to said mild hydrofining and continuously recycling the remainder to said severe hydrofining, whereby substantially all the hydrogen initially supplied in said supply stream is eventually consumed in said mild hydrofining and severe hydrofining zones, said mild hydrofining being carried out at a substantially lower temperature and hydrogen/oil ratio than said severe hydrofining.

2. A process as defined in claim 1 wherein said mild hydrofining is carried out at a hydrogen/feed ratio between about 25 and 400 s.c.f. per barrel, a pressure between about 200 and 1,000 p.s.i.g., and a temperature between about 550° and 750° F., and wherein said severe hydrofining is carried out at a hydrogen/feed ratio between about 600 and 10,000 s.c.f. per barrel, a pressure between about 500 and 10,000 p.s.i.g. and a temperature between about 650° and 850° F., the pressure in said severe hydrofining being substantially higher than the pressure in said mild hydrofining.

3. A process as defined in claim 1 wherein the feedstock to said severe hydrofining comprises a cracked mineral oil fraction, and wherein the feedstock to said mild hydrofining is essentially a straight-run mineral oil fraction.

4. A process as defined in claim 1 wherein each of said hydrofining reactions is carried out in the presence of a catalyst consisting essentially of at least one member selected from the group consisting of group VIB and group VIII metal oxides and sulfides.

5. A process as defined in claim 1 wherein each of said hydrofining reactions is carried out in the presence of a catalyst which is essentially cobalt molybdate supported on an adsorbent carrier.

6. A process as defined in claim 1 wherein the volume of said second tail-gas which is recycled to said mild hydrofining is regulated so as to maintain the hydrogen/methane ratio in the recycle stream to said severe hydrofining at a value greater than about 0.66.

7. A combination reforming, mild-desulfurization, severe-desulfurization process for refining a plurality of mineral oil feedstocks wherein substantially all of the hydrogen produced from said reforming is consumed in said desulfurization reactions, which comprises subjecting a naphtha feedstock to catalytic reforming at a pressure between about 200 and 1000 p.s.i.g. whereby an off-gas is produced containing between about 40% and 85% hydrogen, the remainder being substantially methane, passing said reformer off-gases into a mild catalytic desulfurization unit in admixture with sufficient straight-run, sulfur-containing hydrocarbon stock to give a hydrogen/oil ratio between about 25 and 400 s.c.f. per barrel, subjecting the mixture to catalytic hydrodesulfurization at substantially the reformer pressure and at a temperature between about 550° and 750° F., cooling the effluent from said mild desulfurization and condensing the liquid portion thereof at substantially the reactor pressure, thereby producing a partially desulfurized liquid product and an enriched hydrogen gas phase, continuously passing all of said enriched hydrogen gas phase into a severe catalytic desulfurization unit in admixture with a second sulfur-containing mineral oil fraction and effecting therein catalytic hydrodesulfurization at a temperature between about 650° and 850° F. and substantially higher than the temperature of said mild desulfurization, a pressure between about 500 and 10,000 p.s.i.g. and a total hydrogen/oil ratio between about 600 and 10,000 s.c.f. per barrel of feed, cooling and condensing the liquid product from said severe desulfurization at substantially the reactor pressure, thereby producing a substantially completely desulfurized liquid product and a lean gas phase containing a substantially higher proportion of methane than said enriched hydrogen from said mild desulfurizer, continuously recycling a portion of said lean gas phase to said severe desulfurization unit, and continuously recycling the remainder of said lean gas phase to said mild desulfurization unit, the rate of withdrawal of said second portion being inversely proportional to the hydrogen content of said lean gas phase, whereby the hydrogen/methane ratio in the recycle stream of said severe desulfurizer is maintained between about 0.66 and 1.5.

8. A process as defined in claim 7 wherein the temperature in said severe desulfurization zone is at least about 100° F. higher than in said mild desulfurization zone.

9. A process as defined in claim 7 wherein the pressure in said severe desulfurization zone is at least about 200 p.s.i.g. higher than in said mild desulfurization zone.

10. A process as defined in claim 7 wherein said second sulfur-containing mineral oil fraction is a naphtha fraction boiling between about 100° and 450° F.

11. A process as defined in claim 7 wherein said second sulfur-containing mineral oil fraction is a cracked naphtha boiling between about 100° and 450° F.

References Cited in the file of this patent

UNITED STATES PATENTS

| | | |
|---|---|---|
| 2,587,987 | Franklin | Mar. 4, 1952 |
| 2,672,433 | Porter et al. | Mar. 16, 1954 |
| 2,763,358 | Linn et al. | Sept. 18, 1956 |
| 2,773,008 | Hengstebeck | Dec. 4, 1956 |